United States Patent Office 3,160,575
Patented Dec. 8, 1964

3,160,575
PROCESS FOR THE PRODUCTION OF
ELASTOMERS
Herbert Bartl, Cologne-Stammheim, and Hans Scheurlen, Leverkusen, Germany, assignors to Farbenfabriken Bayer Aktiengesellschaft, Leverkusen, Germany, a corporation of Germany
No Drawing. Filed Apr. 27, 1959, Ser. No. 808,873
Claims priority, application Germany Apr. 30, 1958
4 Claims. (Cl. 204—154)

The present invention relates to copolymers of ethylene and vinyl esters which are cross-linked by means of ionizing rays.

It is known to cross-link polyethylene by means of ionizing rays, more especially electrons having high kinetic energy. It is possible in this way to improve the dimensional stability of polyethylene at elevated temperature and also to increase its resistance to solvents.

It has now been found that if ionizing rays are caused to act on copolymers of ethylene and a vinyl ester, instead of on polyethylene, cross-linked products are obtained which surprisingly also show elastomeric properties as well as an improved dimensional stability at elevated temperature and an improvement in the resistance to solvents. In addition, these copolymers have the advantage that they cross-link substantially more quickly than the pure ethylene polymers.

The copolymers used for cross-linking purposes can be prepared by processes known per se. Particularly good mechanical values are produced with copolymers of ethylene and vinyl esters which are prepared by the process of Italian Patent No. 584,212. The content of vinyl esters incorporated by polymerization is to be 5 to 60 percent, advantageously 20 to 50 percent. Suitable copolymerizable vinyl esters are for example vinyl propionate, vinyl benzoate, vinyl chloracetate, vinyl butyrate, but advantageously vinyl acetate.

The cross-linking is produced by the action of ionizing rays. Ionizing rays are for example X-rays, γ-rays, electron rays of high kinetic energy, protons of high velocity, slow and fast neutrons or α-particles. Of these, electron rays of high velocity, such as can be produced in Van de Graaff generators (U.S. Patent 1,991,236) or with linear accelerators, are particularly suitable. Cobalt 60 or similar radiation sources originating from nuclear reactors can be used as a source for γ-rays.

When using electron rays, a radiation intensity of 1 to 200 megarep is sufficient, depending on the degree of cross-linking which it is desired to obtain.

The rubber-like character of the cross-linked copolymers is shown by the good extensibility with low permanent elongation of the products. The ratio between extensibility to the point of fracture and permanent elongation can be directly taken as a standard for the more or less strongly pronounced rubber-like character. Thus, the product which has the greater similarity to rubber is that which shows the greatest breaking elongation with the lowest permanent elongation, apart from other properties which characterize a good rubber, such as for example the degree of hardness of the products. These characteristic features are present to a considerably greater degree in the copolymers cross-linked by ionizing radiation than in irradiated polyethylene, as shown by the following comparison values.

A commercially available high-pressure polyethylene submitted to a radiation of intensity, for example with 80 megarep, has a breaking elongation of 240 percent with a permanent elongation of 173 percent i.e. the breaking elongation is only about 1.4 times greater than the permanent elongation, whereas a copolymer of 80 parts of ethylene and 20 parts of vinyl acetate irradiated under the same conditions shows a breaking elongation of 220 percent with a permanent elongation of 49 percent. That is to say, the ratio in this case is 4.5:1 and thus is several times greater than with the high-pressure polyethylene. The difference is even more clearly apparent with a copolymer containing 30 percent of vinyl acetate. After the same irradiation dose, it has a breaking elongation of 160 percent and a permanent elongation of 20 percent this corresponding to a ratio of 8:1. A 50 percent copolymer has a breaking elongation of 300 percent and a permanent elongation of 7 percent after being cross-linked with half the radiation dose, i.e. 40 megarep; and this corresponds to a ratio of 43:1, a value which is also found with vulcanized rubber.

As can be inferred from a comparison of the numerical data, the more vinyl ester is incorporated by polymerization into the copolymers, the more strongly are they cross-linked by the same dose of electron rays. Comparison of high-pressure polyethylene and a 30 percent copolymer, which are cross-linked to the degree of equal permanent elongation, for example 173 percent shows that the copolymer also has a considerably greater extensibility after this comparison. The breaking elongation for the copolymer is 400 percent, while only a value of 24 percent is obtained for the high-pressure polyethylene.

The copolymer can be mixed with the conventional rubber fillers, age resisters or pigments. It has been shown that considerable improvements in the mechanical values can be produced by using active carbon black as filler in an amount of 0.1 to 10 percent by weight and more. For example, if a 30 percent copolymer has a tensile strength of 90 kg./cm.$^2$ with an irradiation dose of 40 megarep, the same copolymer, filled with active carbon black, has a strength of 200 kg./cm.$^2$ with the same irradiation period. The absorption capacity of the copolymers for fillers, such as for example carbon black, is considerably greater than that of polyethylene.

The foregoing results were obtained experimentally in the following manner:

Test elements with the dimensions 120 x 15 x 2 mm. are produced by pressing and subsequent stamping from the copolymers and also from the high-pressure polyethylene, obtained by polymerization at about 200° C. and an ethylene pressure of 1600 atm. gauge. These strips are arranged on an endless band in the electron beam of a Van de Graaff band generator. The generator supplies a voltage of 1.5 mev. and an electron current of 168 microamperes. The radiation dose per radiated sample is established by the speed of the band carrying the samples or by the number of irradiations carried out on one sample.

The tensile strength and breaking elongation of the irradiated samples are determined. The permanent elongation can also be established from the change in length of the tested elements after the tensile strength test.

The process claimed can be used on articles of any desired shape made of the ethylene-vinyl ester copolymers, such as for example for cross-linking foils, plates, tires, pipes, bottles or textile coatings.

What is claimed is:
1. A process for the production of elastomers, wherein high energy ionizing radiation of 1–200 megarep is caused to act on copolymers of ethylene and 5–60% by weight of organic vinyl esters to transform said copolymers from thermoplastic copolymers into rubbery copolymers.

2. Process of claim 1 wherein said vinyl ester is vinyl acetate.

3. Process of claim 1 wherein the ethylene-vinyl ester copolymers exposed to said ionizing radiation contain at least 0.1% by weight of carbon black.

4. A process for the production of an elastomeric composition comprising subjecting a copolymer of ethylene and 15–60% by weight of vinyl acetate to high energy ionizing radiation of at least $1 \times 10^6$ roentgens.

References Cited in the file of this patent

FOREIGN PATENTS

| | | |
|---|---|---|
| 732,047 | Great Britain | June 15, 1955 |
| 742,933 | Great Britain | Jan. 4, 1956 |

OTHER REFERENCES

Lawton et al.: "Nature," vol. 172, pp. 76, 77, July 11, 1953.